US007027222B2

United States Patent
Takahashi et al.

(10) Patent No.: US 7,027,222 B2
(45) Date of Patent: Apr. 11, 2006

(54) THREE-DIMENSIONAL OBSERVATION APPARATUS

(75) Inventors: Susumu Takahashi, Iruma (JP); Kazuo Morita, Hachioji (JP)

(73) Assignee: Olympus Corporation, Tokyo (JP)

( * ) Notice: Subject to any disclaimer, the term of this patent is extended or adjusted under 35 U.S.C. 154(b) by 5 days.

(21) Appl. No.: 10/422,771

(22) Filed: Apr. 25, 2003

(65) Prior Publication Data

US 2003/0214710 A1      Nov. 20, 2003

(30) Foreign Application Priority Data

May 17, 2002    (JP)    ............................. 2002-142544

(51) Int. Cl.
  *G02B 27/22*    (2006.01)
  *G03B 21/14*    (2006.01)
(52) U.S. Cl. ............................. 359/463; 353/7; 353/79; 248/291.1
(58) Field of Classification Search ................ 359/462, 359/464, 454, 457, 456, 463; 348/51, 42, 348/44; 351/240; 353/77, 8, 71, 72, 7, 79; 345/9; 248/291.1
See application file for complete search history.

(56) References Cited

U.S. PATENT DOCUMENTS 3,536,832 A * 10/1970 Erich et al. .................... 348/44
5,408,282 A * 4/1995 Nagashima et al. .......... 353/77
5,714,967 A   2/1998 Okamura et al.
6,163,336 A * 12/2000 Richards ....................... 348/42
6,259,426 B1 * 7/2001 Harada et al. ............... 345/581
6,407,859 B1 * 6/2002 Hennen et al. .............. 359/454
2002/0186348 A1 * 12/2002 Covannon et al. .......... 351/240

FOREIGN PATENT DOCUMENTS

FR           2634045 A   *  1/1990
JP           51-24116         2/1976

* cited by examiner

*Primary Examiner*—Audrey Chang
(74) *Attorney, Agent, or Firm*—Arnold International; Bruce Y. Arnold

(57)    ABSTRACT

A three-dimensional observation apparatus includes a pair of image projection means, an image display means, a position detecting means for detecting movements of an observer of images displayed by the image display means, and a driving means for tracking movements of the observer and for moving the image display means based on changes of signals that are output from the position detecting means. The pair of image projection means and the image display means are configured such that the pair of image projection means projects a right eye image and a left eye image, and the image display means presents these images to the right eye and left eye, respectively, of an observer. A diffusing means may be provided to enlarge the exit pupils of the three-dimensional observation apparatus.

19 Claims, 18 Drawing Sheets

THREE-DIMENSIONAL OBSERVATION APPARATUS

CROSS REFERENCE TO RELATED APPLICATION

This application is related in subject matter to U.S. application Ser. No. 10/361,631 filed Feb. 11, 2003. Also, this application claims the benefit of foreign priority from Japanese Patent Application No. 2002-142544, filed May 17, 2002, the contents of which are hereby incorporated by reference.

BACKGROUND OF THE INVENTION

FIG. 18 shows a prior art stereoscopic observation device disclosed in Japanese Laid-open Patent Application No. 51-24116 that includes a concave mirror ME, and facing this, right and left concave mirrors MPR, MPL, and right and left image display devices PR, PL arranged as illustrated so that an observer can view three-dimensional images from the right and left eye positions ER, EL, respectively.

FIG. 19 is a side view of the stereoscopic observation device of FIG. 18 having been flipped upside down, for convenience of explanation. The viewing pupil positions ER, EL of the right and left eyes, the positions of each image ER', EL' formed by the concave mirror ME for both eyes, and the positions of each image ER", EL" formed by the concave mirrors MPR, MPL are illustrated. Also shown is the center of curvature C of the concave mirror ME and the centers of curvature CPR, CPL of the concave mirrors MPR, MPL.

However, with the above-described, well-known device, concave mirror manufacturing costs and installation costs are high because image distortion will easily result due to any of installation errors, profile irregularities in the concave mirror, and large variations in the focal position. Furthermore, if the viewing position of the observer is offset from the specified position, the image will become greatly distorted, and thus the observation posture and observation position are limited. Therefore, handling the stereoscopic observation device is inconvenient during observation. The exit pupil may be enlarged in order to increase the positioning freedom during observation. However, in order to enlarge the exit pupil in this stereoscopic observation device, the concave mirror must be enlarged. Therefore, the overall size of the device increases.

BRIEF SUMMARY OF THE INVENTION

The present invention relates to a three-dimensional observation apparatus having a compact configuration whereby the observer can always view high quality images without distortion even when the viewing position changes. The present invention is characterized by having a pair of image projection means and an image display means, and these are configured such that the pair of image projection means projects a right eye image and a left eye image, and the image display means presents these images to the right and left eyes of an observer. Moreover, a position detecting means detects movements of the observer's head, and a driving means tracks these movements and moves the image display means based on the output from the position detecting means so that bright images can be viewed without distortion.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1C:
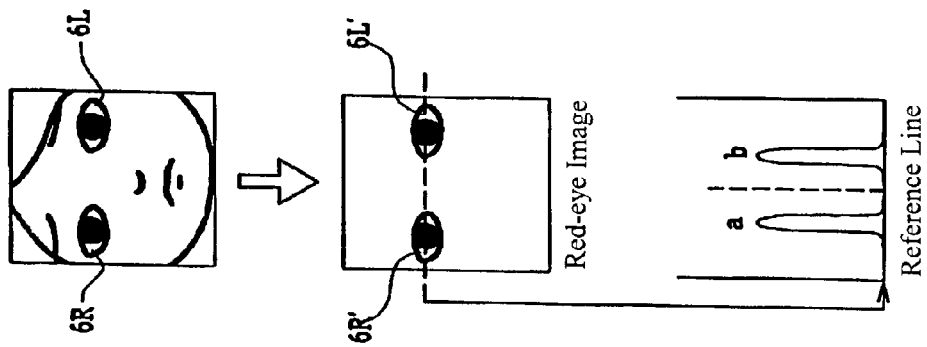
FIGS. 1(a)–1(c) show the three-dimensional observation apparatus according to Embodiment 1, with FIG. 1(a) being a general schematic diagram of the components of the apparatus, with FIG. 1(b) being a schematic diagram of a position detecting means for detecting movement of the apparent position of the observer, and with FIG. 1(c) being a diagram for illustrating the basic principles for tracking movements of the apparent position of the observer and for moving the image display means based on the changes of output from the position detecting means so that the observer is provided with greater freedom of movement while using the three-dimensional observation apparatus.

The present invention relates to a three-dimensional observation apparatus which enables an observer to view stereoscopic images without needing to wear special glasses.

According to a first feature of the present invention, the pair of image projection means, the image display means, the position detecting means, and the driving means are mounted on one supporting body, the position detecting means includes an infrared LED capable of irradiating the face or the pupils of the left and right eyes of an observer, and an infrared camera is provided that is capable of imaging the outline of the face of the observer or the retinal reflected images of the observer's pupils.

According to a second feature of the present invention, the pair of image projection means, the image display means, the position detecting means, and the driving means are mounted on one supporting body, the position detecting means includes a visible light emitting LED capable of irradiating the face of the observer, and a camera is provided that is capable of imaging the outline of the face of the observer.

According to a third feature of the present invention, the pair of image projection means, the image display means, the position detecting means, and the driving means are mounted on one supporting body, the position detecting means includes an infrared or visible light emitting LED capable of irradiating the face of the observer, and a CMOS image sensor is provided that is capable of capturing the outline of the face irradiated by the LED and of outputting an edge-detection image thereof.

According to a fourth feature of the present invention, the pair of image projection means, the image display means, and the position detecting means are mounted on a first supporting body, the first supporting body is mounted to a second supporting body that supports the first supporting body via the driving means, and the driving means is capable of moving the pair of image projection means, the image display means, and the position detecting means relative to the second supporting body.

According to a fifth feature of the present invention, the image display means is mounted so as to be movable also in a direction that is orthogonal to the movement direction resulting from the driving means.

Several embodiments of the invention will be described below with reference to the drawings.

EMBODIMENT 1

FIGS. 1(*a*)–1(*c*) show the three-dimensional observation apparatus according to Embodiment 1, with FIG. 1(*a*) being a general schematic diagram of the components of the apparatus, with FIG. 1(*b*) being a schematic diagram of a position detecting means for detecting movement of the apparent position of the observer, and with FIG. 1(*c*) being a diagram for illustrating the basic principles for tracking movements of the apparent position of the observer and for moving the image display means based on the changes of output from the position detecting means so that the observer is provided with greater freedom of movement while using the three-dimensional observation apparatus.

Referring to FIG. 1(*a*), a supporting body 1 supports a pair of image projection means 2R and 2L that are capable of projecting right eye and left eye images having a predetermined spacing, a driving means 3 that is formed of, for example, a step motor that is attached to the supporting body 1, a supporting shaft 4 that is driven by the driving means 3, and a clamp member 4a that is attached to the supporting shaft 4 via a joint that permits rotation about an axis orthogonal to the axis of the supporting shaft 4. An image display means 5 is held by the clamp member 4a of the supporting shaft 4 so as to not move unexpectedly, and is configured so as to present the right eye and left eye images that are projected from the pair of image projection means 2R, 2L to the right and left eyes 6R (6L) respectively, of an observer 6. A position detecting means 7 is attached at a lower position of the image display means 5 so as to face the observer 6, and is capable of detecting movements of the observer's head. The position detecting means includes a condensing lens 7a, plural infrared LEDs 7b, 7b, and an infrared camera 7c, as shown in FIG. 1(*b*).

The driving means 3 is configured so as to be capable of rotating the supporting shaft 4, which supports the image display means 5 in the left and right directions within a range of ±30° so as to maintain a proper viewing position relative to the image display means regardless of motion of the observer's head.

The three-dimensional observation apparatus of the present invention is provided with a projection optical system for projecting images from two apertures onto a display surface, and an image-formation optical system for forming images of the two apertures at exit pupils, from which the observer views stereoscopic images using the three-dimensional observation apparatus. A diffuser optical system is preferably used for enlarging these exit pupils. Thus, the projection optical system projects from two apertures, left and right eye images onto a single display surface. The image-formation optical system is positioned at the single display surface and forms images of the two apertures of the projection optical system at regions in space. This enables stereoscopic observation images to be observed by the observer placing his head in a position such that the observer's eyes are positioned within these regions in space, which are the exit pupils of the three-dimensional observation apparatus.

Preferably, the diffuser optical system, which is positioned on the display surface, enlarges the two exit pupils (i.e., the projected images of the two apertures of the projection optical systems) in two regions in space such that the two regions in space are separated by a short distance that is less than the inter-pupil distance of an observer. Therefore, these regions do not overlap. Because the two images that are projected have different parallax, images having left and right parallax are projected to the exit pupils of the three-dimensional observation apparatus. Use of the diffuser optical system enables these images to be projected as enlarged images. Thus, the present invention enables an observer to observe stereoscopic images while in a comfortable posture without having to wear special glasses.

By using a configuration whereby left and right projection images are formed at the same display surface position, as in the three-dimensional observation apparatus of the present invention, the focal position of the image and the convergent positions of the left and right pupils of the observer's eyes are aligned. Therefore, an observer will not experience any disorientation and will be able to comfortably observe stereoscopic images without fatigue.

By providing a diffuser optical system at the display surface position, the pupils of the image projection optical system need not be large. Thus, the image quality of the three-dimensional observation apparatus can be improved and the size can be reduced.

Differences in the luminous flux output by the projection optical systems may be decreased by providing a diffuser optical system at the display surface. Thus, the luminous flux can be made more uniform by the diffusing effect at the display surface. This enables an observer to view observation images without distortion in any position that the exit pupils for observation are positioned. Moreover, the image quality does not deteriorate if the pupil image formation means of the left and right images is positioned as in the observation device of the present invention. More specifically, the image quality does not deteriorate even if a Fresnel lens is used as the image formation means so as to form the exit pupils for observation. Furthermore, the image quality does not deteriorate if a pupil enlarging effect is provided at the image forming position of the left and right images, such as by using a diffuser.

In the three-dimensional observation apparatus of the present invention, the system can be made more compact by positioning both the image formation means that forms the exit pupil for observation and the diffusing means for enlarging the exit pupils at a single flat panel component which forms the display surface. This enables deterioration of image quality to be controlled even if the flat panel is configured so as to be tilted with respect to the viewing position.

Figure 1A:
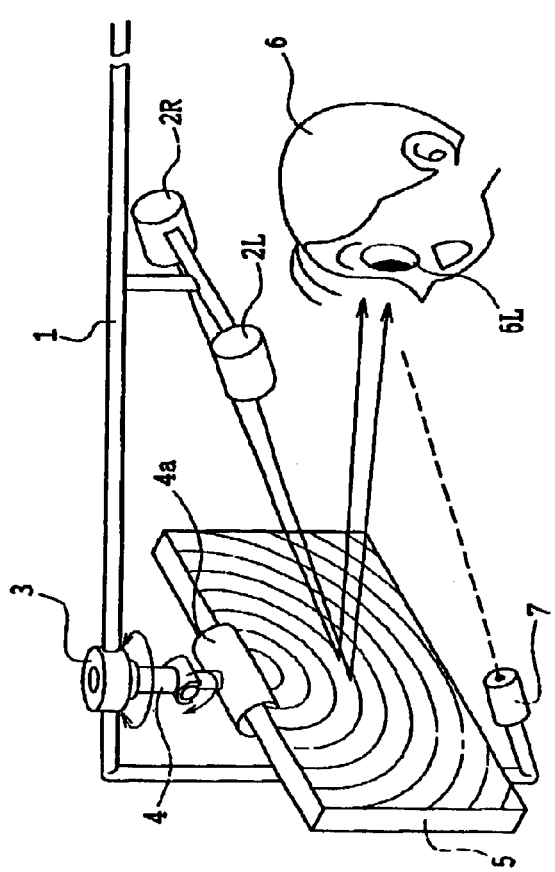
Figure 2A:
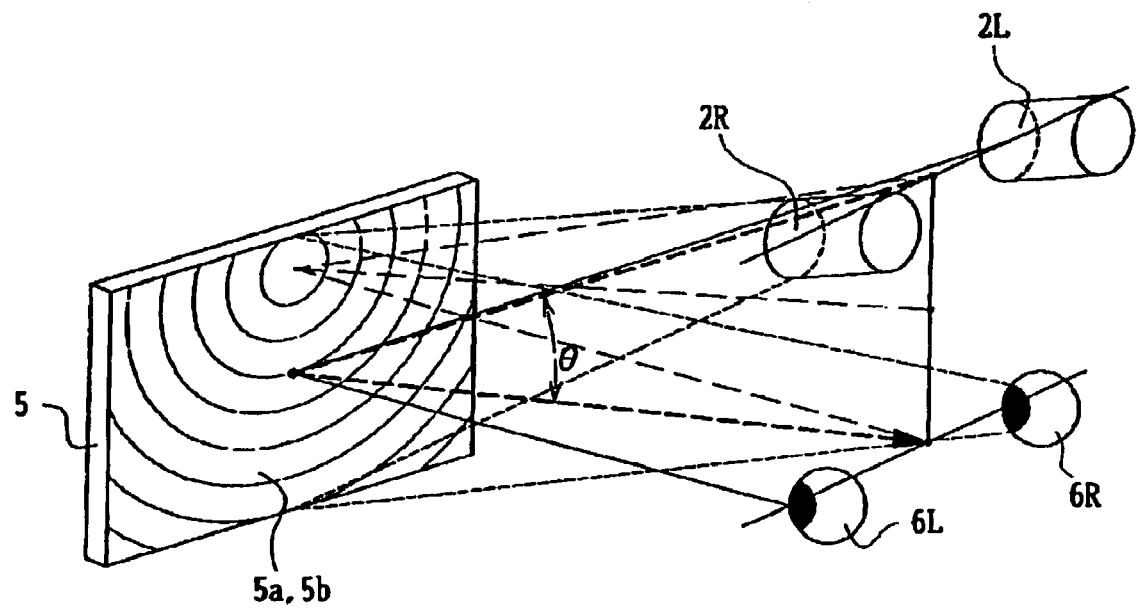
FIGS. 2(a) and 2(b) show the image display means shown in FIG. 1(a), with FIG. 2(a) being a perspective view, and FIG. 2(b) being a side view.
Figure 2B:
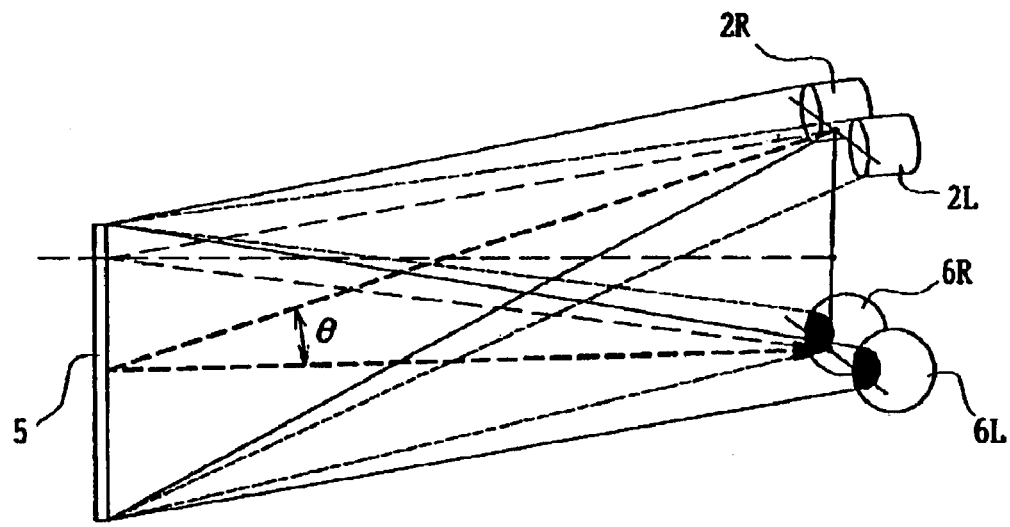

FIGS. 2(a) and 2(b) show the image display means shown in FIG. 1(a), with FIG. 2(a) being a perspective view, and FIG. 2(b) being a side view.

Referring to FIG. 2(a), the image display means 5 is formed of a flat substrate, Fresnel mirror 5a and a diffusing means 5b. The Fresnel mirror serves as an image formation optical system for forming images of each aperture 2R, 2L of the image projection means at exit pupils 6R, 6L. The observer views the stereoscopic images produced by the three-dimensional observation apparatus by placing his right and left eyes at these exit pupils and viewing the display panel. The diffusing means 5b serves to enlarge these exit pupils, which allows the apertures of the image projection means to be made smaller than would otherwise be possible, while still providing exit pupils of a size that enables the observer to easily position his eyes at the exit pupils. To avoid the head of the observer from interfering with the projected light from the projection optical systems, and to allow the observer to observe the image display means from the front, an angle θ is provided between the light projected to the center of the image display means 5 and a line from this center to a point midway between the center of the exit pupils. The optical axis of the Fresnel mirror 5a is made eccentric by having its center positioned above the center of the image display means 5.

Figure 3:
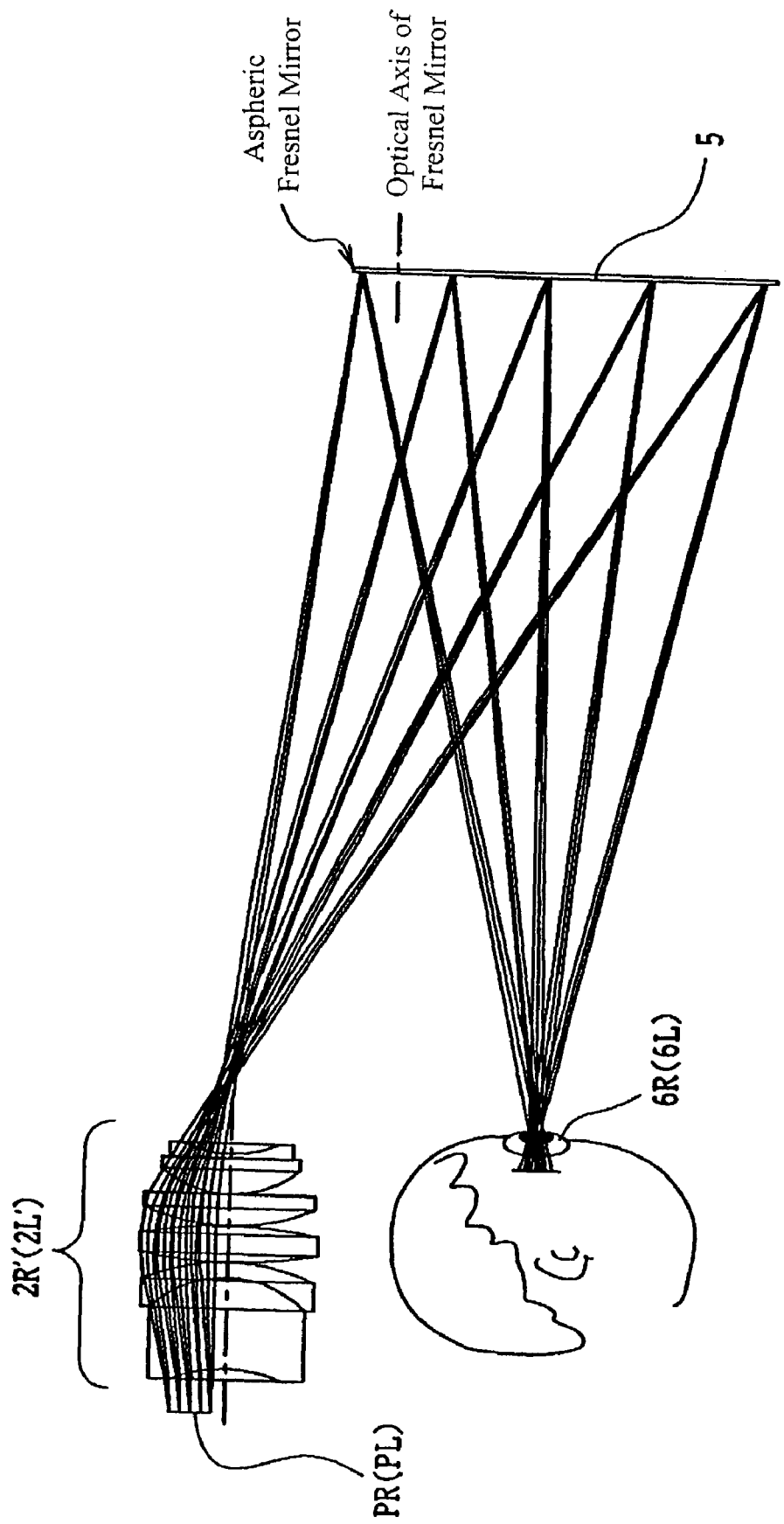
FIG. 3 shows another example configuration of the image display means that prevents the head of an observer from interfering with the image projection means.

FIG. 3 shows another example configuration of an image display means that prevents the head of an observer from interfering with the image projection means. In this example, spherical lens systems 2R' (2L') are used in right and left image projection means and, by positioning an image display element surface PR (PL) at an eccentric position relative to a line normal to the center of the image display means 5, the observer's head is prevented from interfering with the image projection means.

The image display means 5 is positioned with its surface parallel to a vertical surface that includes the eyes of the observer, and an aspheric Fresnel mirror is positioned on the side of the image display means that is remote from the viewer. In this example, the image display means 5 may be oriented at an angle of ±30° from the vertical position. Excellent images are provided when the image display means is oriented within a range of about ±15° from the vertical position.

Figure 4:
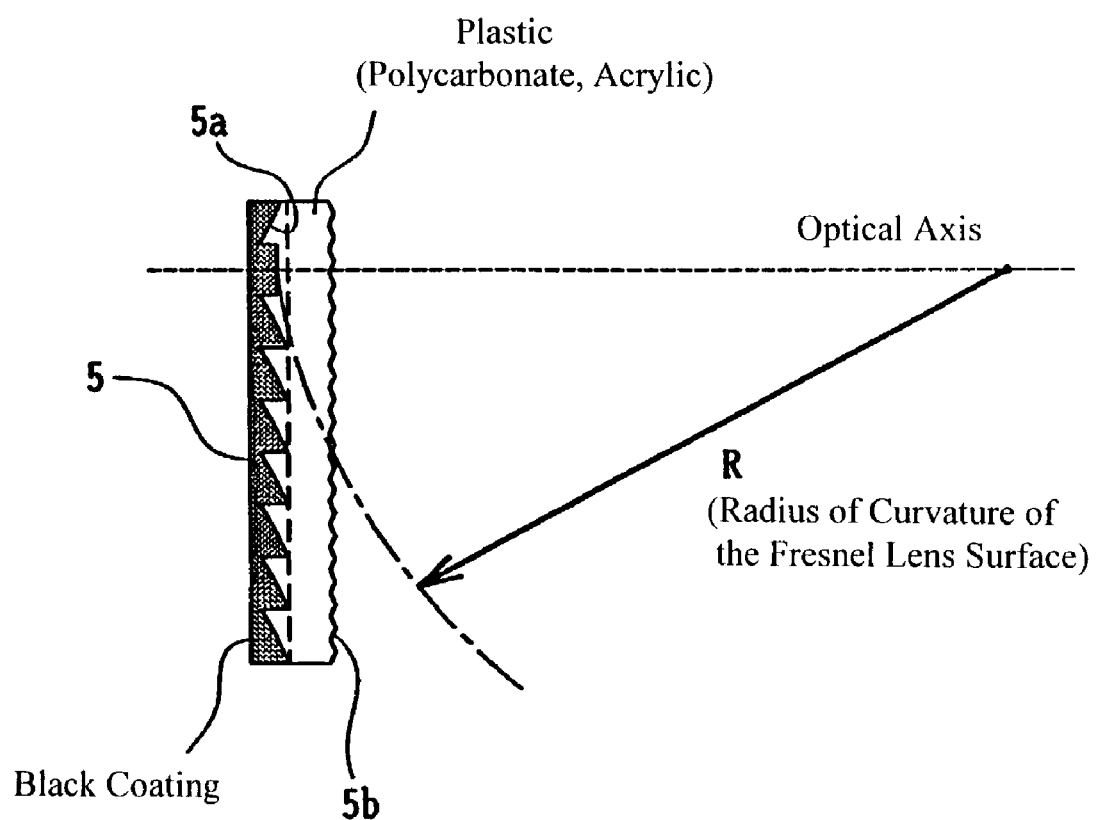
FIG. 4 is a side view of an example of a detailed configuration of an image display means.

FIG. 4 is a side view example of a detailed configuration of an image display means. As is apparent from this figure, the image display means 5 is configured such that the Fresnel surface of the Fresnel mirror 5a and the diffusing surface that serves as the diffusing means 5b (formed, for example, of randomly positioned wave or corrugated surfaces) are integrally formed. More specifically, the display panel is integrally formed by pressing a plastic resin such as acrylic or polycarbonate between metal molds so as to form a Fresnel surface on one side and a diffusing surface on the other side. Aluminum is subsequently coated as a reflective film on the Fresnel surface, and a black coating is then coated thereon to serve as a protective coating.

The image display means 5, shown in FIG. 4, is configured as an eccentric Fresnel back-surface mirror. Next, the radius of curvature R of a Fresnel surface 5a of a front-surface mirror versus a Fresnel back-surface mirror is considered.

The relationship of radius of curvature R to focal distance f when configured as a back-surface mirror is $R = 2n \cdot f$, where n in the index of refraction. On the other hand, the relationship of radius of curvature R to focal distance f when configured as a front-surface mirror is $R = 2f$. Therefore aberrations are reduced when an image is formed at the exit pupil by using a back-surface mirror because a larger radius of curvature of the Fresnel surface can be used, for a given focal distance, by configuring the image display means as a back-surface mirror, as shown in FIG. 4. Furthermore, the image display means is configured as an aspheric Fresnel surface such that the radius of curvature increases toward the periphery of the Fresnel surface 5a. When configured in such a manner, aberrations can be advantageously controlled using an aspheric surface when an image is formed and viewed by an observer placing his eye at an exit pupil.

Figure 5:
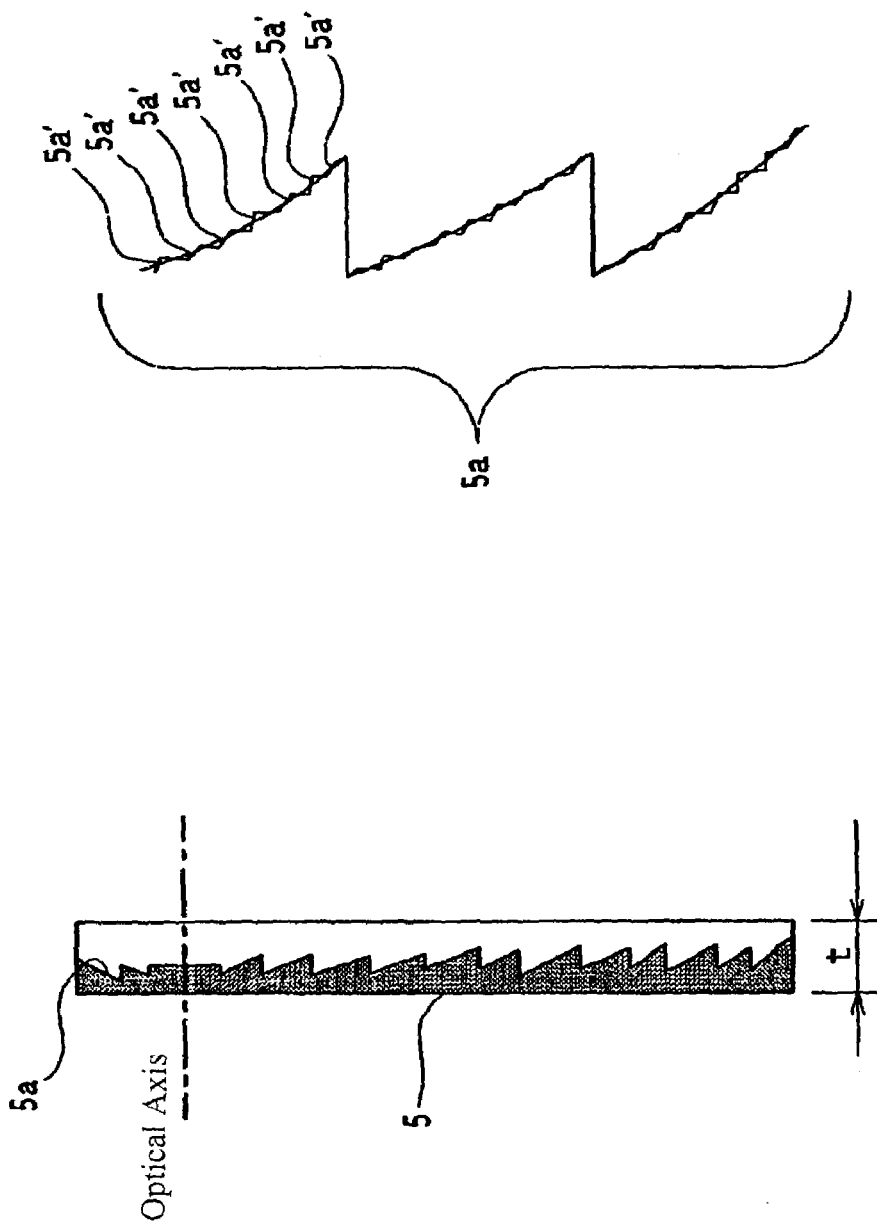
FIGS. 5(a) and 5(b) show a second example of a detailed configuration of an image display means, with FIG. 5(a) being a side view, and FIG. 5(b) being an enlarged view of the diffusing means.

FIGS. 5(a) and 5(b) show another example of a detailed configuration of an image display means 5, with FIG. 5(a) being a side view and FIG. 5(b) being an enlarged, side view of a diffusing means 5a shown in FIG. 5(a). In this example, the image display means is configured with an integrally formed fine corrugated surface 5a' on the Fresnel surface 5a, as shown in FIG. 5(b), in place of using a diffusing surface 5b having corrugated surfaces that are randomly positioned, as shown in FIG. 4. A reflective film is coated on the Fresnel surface 5a, so that a Fresnel back-surface mirror is formed.

With an image display means as shown in FIG. 4, the projection light normally passes through the diffusing surface twice. However, in the reflective image display means shown in FIGS. 5(a) and 5(b), the fine corrugated surface 5a' that provides a diffusing effect is formed on the back surface that is reflective. Thus, the projection light is affected by the diffusing surface just once, and because the diffusing effect occurs only once, blurring is reduced and image deterioration can be more easily controlled.

Figure 6:
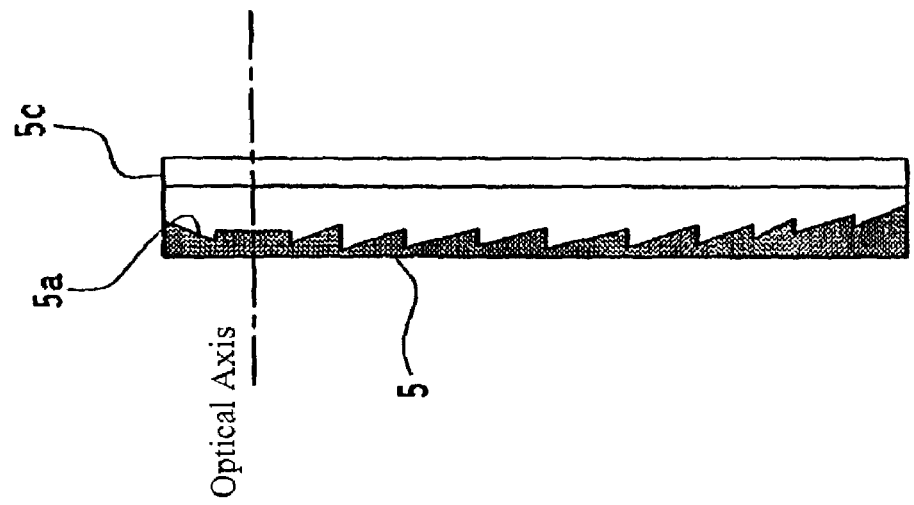
FIG. 6 is a side view that shows yet another example of a detailed configuration of an image display means.

FIG. 6 is a side view of yet another example configuration of an image display means. In this example, the Fresnel surface 5a that serves as a Fresnel mirror faces the diffusing surface 5b and is positioned in close proximity thereto. In this example, the Fresnel surface 5a can be positioned in very close proximity to the diffusing surface 5b. Thus, even though the projection image passes through the diffusing surface twice, blurring can be held to a minimum. In addition to configuring the image display means by bringing the back-surface Fresnel mirror and the diffusing plate in close proximity, a configuration whereby a diffusing film is applied to the back-surface Fresnel mirror in place of the diffusing plate is also possible.

Figure 7:
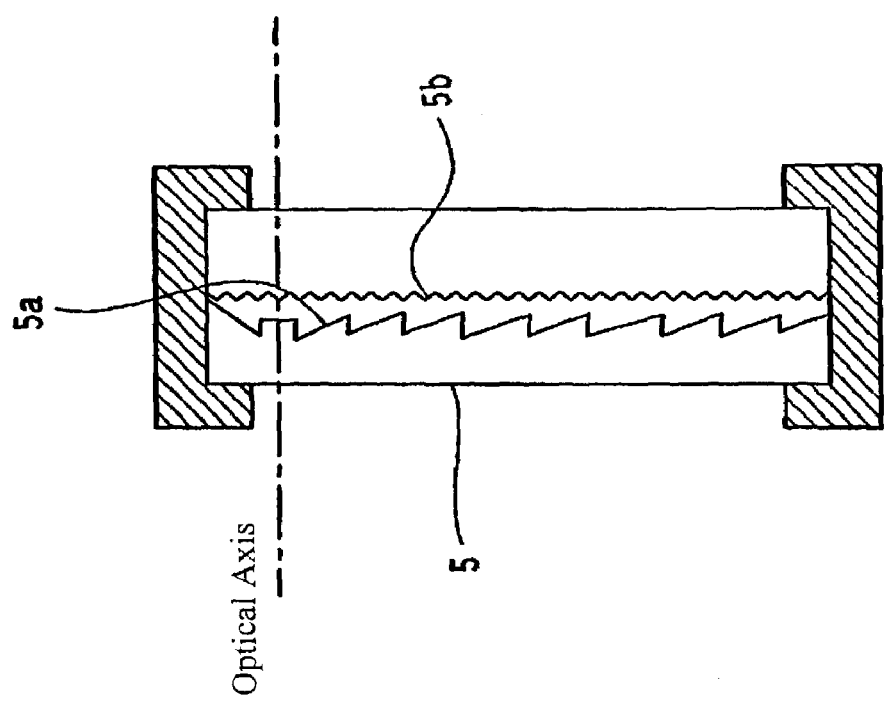
FIG. 7 is a side view of yet another example of a detailed configuration of an image display means.

FIG. 7 is a schematic diagram viewed from the side showing yet another example of a configuration of an image display means 5. This example shows an image display means configured by applying a diffusing film 5c in place of forming a fine corrugated surface on the surface of the eccentric Fresnel back-surface mirror shown in FIG. 4. It should be noted that the diffusing film 5c may be formed of internal diffusers, or diffusers due to corrugations formed on a surface.

Figure 8C:
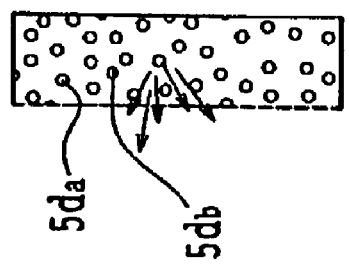
FIGS. 8(a)–8(c) are diagrams showing a detailed configuration of yet another example of an image display means, with FIG. 8(a) being a side view, with FIG. 8(b) being a possible variation in the structure shown in FIG. 8(a), and with FIG. 8(c) showing an internal diffuser.
Figure 8B:
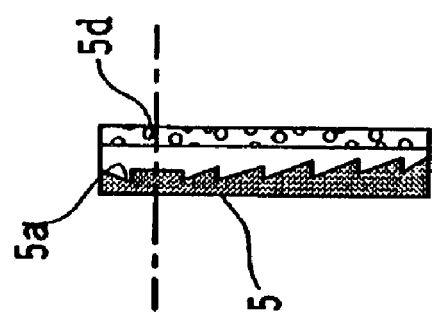
Figure 8A:
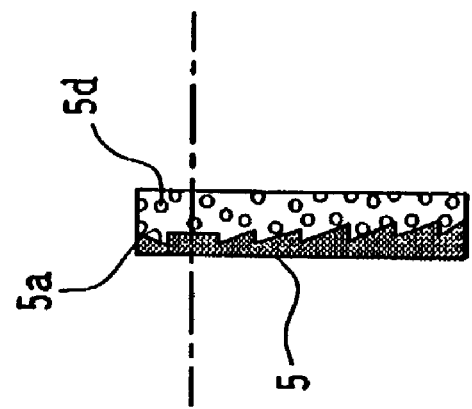

FIGS. 8(a)–8(c) show yet another example of an image display means, with FIG. 8(a) being a side view, with FIG. 8(b) being a possible variation to the image display means shown in FIG. 8(a), and with FIG. 8(c) showing internal diffusers. In each of FIGS. 8(a)–8(c) internal diffusers serve as the diffusing means. The internal diffusing-type diffuser shown in FIG. 8(c) is formed by mixing transparent fine particles 5da, 5db and so forth, which differ in refractive index, into a plastic material. When struck by light, these fine particles 5da and 5db diffuse the light.

The image display means of FIG. 8(a) is formed by combining a diffuser having fine particles 5d mixed into a plastic material that is then molded as an eccentric Fresnel back-surface mirror 5a so as to form an integral unit. The image display means of FIG. 8(b) is formed of an eccentric Fresnel back-surface mirror and an internal diffusing-type diffuser that is formed by mixing fine particles 5d into a plastic material. These two components are then joined or positioned in close proximity to one another. In this configuration, a diffusing film may be applied to the surface of the eccentric Fresnel back-surface mirror in lieu of using an internal diffusing-type diffuser.

Figure 9C:
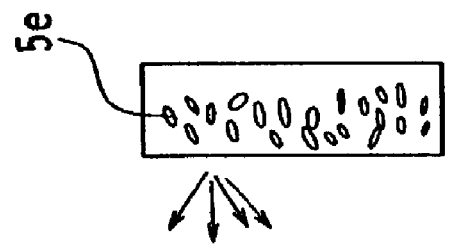
FIGS. 9(a)–9(c) show a detailed example of yet another configuration of an image display means, with FIG. 9(a) being a side view, with FIG. 9(b) being a possible variation in the structure shown in FIG. 9(a), and with FIG. 9(c) being a diagram showing the internal diffuser.
Figure 9B:
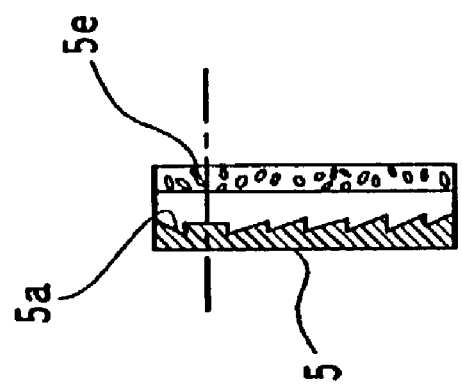
Figure 9A:
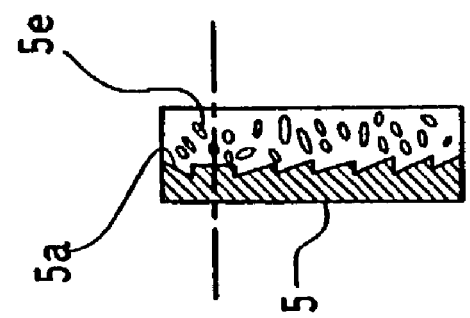

FIGS. 9(a)–9(c) show yet another example of an image display means 5, with FIG. 9(a) being a side view, with FIG. 9(b) showing a possible variation of the structure shown in FIG. 9(a), and with FIG. 9(c) showing the internal diffuser configuration. This example is configured as an internal diffusing-type display means using a polymer liquid crystal as a diffusing means. Liquid crystal can be stabilized by using a polymer liquid crystal, and this has been applied in the present example. The polymer 5e is birefringent and is internally unsettled, similar to that of liquid crystal. By allowing the polymer 5e to polymerize, the polymer 5e can be set in a fixed state having an internal arrangement that is random, as shown in FIG. 9(c).

FIG. 9(a) shows a polymer liquid crystal diffusing means integrally formed with an optical member that includes a Fresnel surface 5a of an eccentric, Fresnel, back-surface mirror. FIG. 9(b) shows an eccentric, Fresnel, back-surface mirror and a diffusing means formed of polymer liquid crystal that can be integrally joined together or positioned in close proximity to one another. Instead of a diffusing means formed of polymer liquid crystal, a diffusing film may be applied to the surface of an eccentric, Fresnel, back-surface mirror.

According to the present image display means thus configured, the light is just slightly affected by the refractive effect in accordance with the eccentric direction because the polymer 5e is set in a fixed state having birefringence. The diffusing effect occurs by internal scattering for the entire polymer liquid crystal layer. The surface can be formed in a flat shape because internal scattering is used for the diffusing effect. Therefore, the surface is easier to wipe when unclean, and an anti-reflective film is easier to apply to prevent reflection of outside light.

Figure 1B:
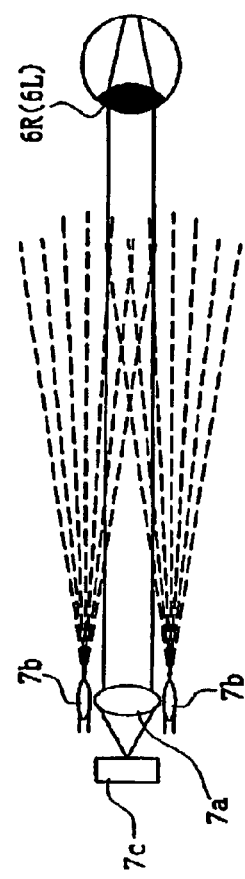

Next, a position detecting means 7 which emits and detects infrared light will be described. The position detecting means 7, as shown in FIG. 1(b), is provided with a condensing lens 7a capable of condensing light that is reflected from the right and left eyes 6R and 6L of an observer, a plurality of infrared LEDs 7b, 7b positioned nearby the condensing lens 7a so as to be capable of irradiating the left and right eyes of the observer on substantially the same axis as the optical axis of the condensing lens, and an infrared camera 7c having an image sensor positioned at the condensing position of the condensing lens 7a. The LEDs 7b, 7b and the condensing lens 7a are positioned and oriented so as to face upward from below the image display means 5 so that light from the LEDs 7b, 7b that is reflected by the right and left eyes of the observer is easily captured by the condensing lens 7a.

Because the first embodiment of the invention is configured as described above, when an observer 6 faces the image display means 5, manually adjusts the image display means, and views the images that are projected onto the image display means 5 by the image projection means 2R and 2L, an excellent, bright, stereoscopic image can be viewed without distortion.

If the right and left eyes 6R, 6L are moved to the right, for example, when the face is turned right from this observation position, the red-eye images 6R', 6L' (FIG. 1(c)) formed by the reflective light from the retinas of the right and left eyes, which were previously being imaged with good balance in the center of the imaging surface of the infrared camera 7c, move to the right, and the intermediate position (shown by the vertical dashed-line) of the pair of peaks a and b of the output signal wave pattern from the imaging sensor moves to the right. The step motor of the driving means 3 is therefore rotated to the right so as to cause the intermediate position of the pair of peaks a and b to align with a standard line. In this way, the image display means 5 tracks the movements of the eyes of the observer 6. This tracking movement is performed in a similar manner when the face is turned to the left, so that the image display means remains aligned so as to provide bright images to the observer.

EMBODIMENT 2

Figure 10:
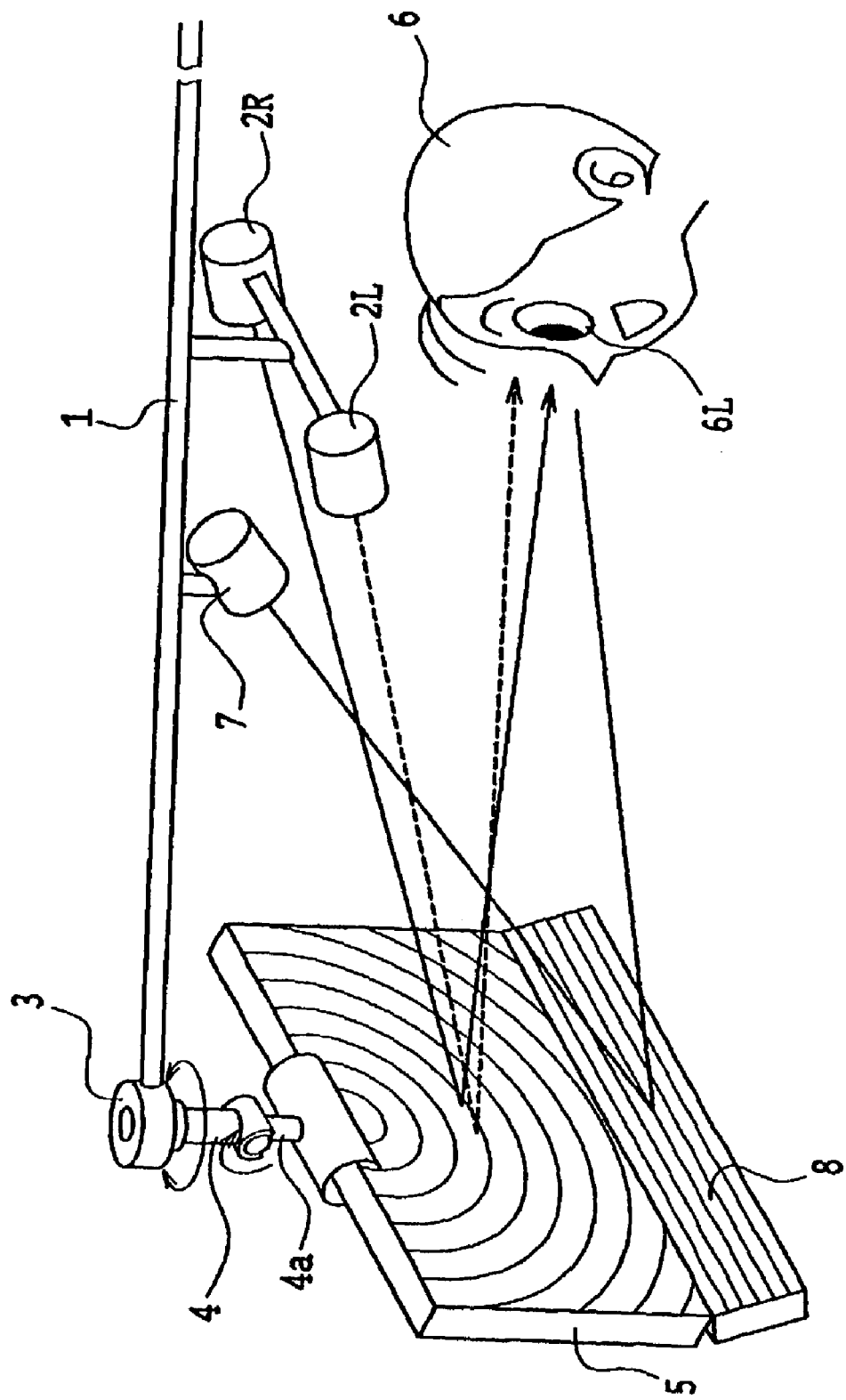
FIG. 10 shows a three-dimensional observation apparatus according to Embodiment 2.

FIG. 10 shows a three-dimensional observation apparatus according to Embodiment 2 of the present invention. Like parts are identified with the same reference numerals as discussed in Embodiment 1, and thus description of such items will not be repeated. This embodiment differs from that of the first embodiment in that the position detecting means 7 is attached to a supporting body 1 at a position that is above the observer 6, and a flat surface, Fresnel mirror 8 is attached to the lower portion of the image display means 5. The Fresnel mirror 8 is used to direct infrared light that is emitted by the position detecting means 7 to the eyes of the observer and to reflect "red-eye" light from the right and left eyes of the observer back to the position detecting means 7. The Fresnel mirror 8 may be integrally formed with the image display means 5, and may be attached so as to be capable of moving with respect to the image display means 5 in order to be able to precisely direct the infrared light from/to the position detecting means 7 via the eyes of the observer 6.

In the second Embodiment thus configured, the effects are the same as in the first Embodiment. Further description will therefore be omitted except to note that, in this embodiment in particular, a reflective surface for use with the position detecting means 7 is provided on the image display means. Therefore, a position detecting means that protrudes from below the image display means as in the first embodiment is avoided. As the position detecting means need not be positioned in the immediate vicinity of the operating area, this provides more space in the surgical area, sterilization is simplified, and a drape need not be used. Furthermore, electric cords can be more easily arranged out of the way so as to provide improved electrical reliability.

EMBODIMENT 3

Figure 11:
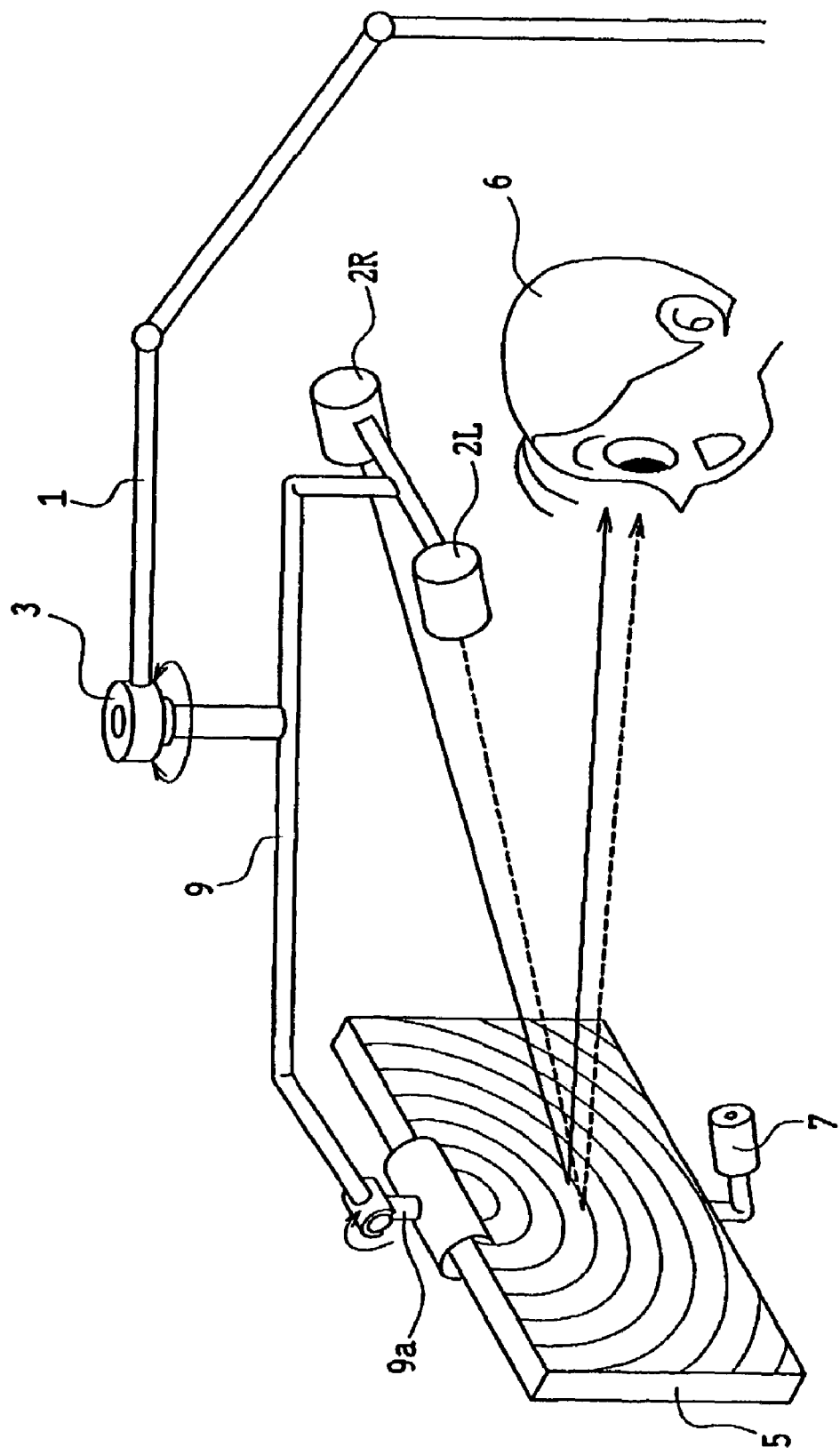
FIG. 11 shows a three-dimensional observation apparatus according to Embodiment 3.

FIG. 11 shows a three-dimensional observation apparatus according to Embodiment 3 of the present invention. This example differs from Embodiment 1 in that a second supporting body 1 is configured so as to be capable of folding via hinges, a first supporting body 9 that is linked to the output axle of the driving means 3 is provided, image projection means 2R and 2L are attached to one end of the first supporting body 9, and image display means 5 is attached via clamp member 9a which is configured so as to be capable of rotating relative to the first supporting body 9.

In Embodiment 3 thus configured, the effects are the same as in the first Embodiment and further description will therefore be omitted except to note that, in this Embodiment in particular, the quality of the displayed images is maintained even when the head position is varied because the positional relationship between the image projection means and the image display means remains fixed. Moreover, images are presented at an optimal position for image quality because the position detecting means is integrated with the image display means.

EMBODIMENT 4

Figure 12:
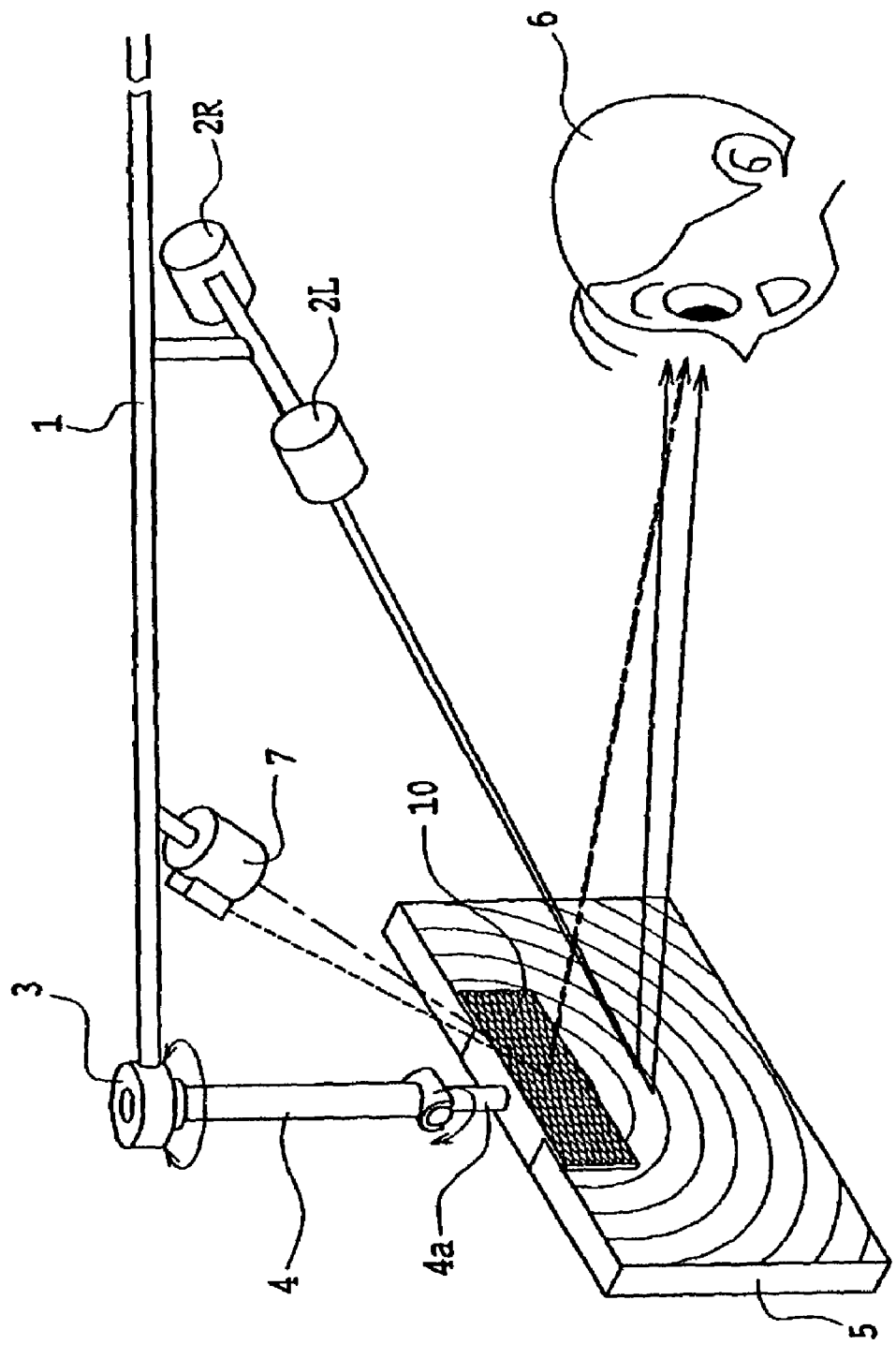
FIG. 12 shows a three-dimensional observation apparatus according to Embodiment 4.

FIG. 12 shows a three-dimensional observation apparatus according to Embodiment 4 of the present invention. Once again, like parts are identified with the same reference numerals as discussed in Embodiment 1, and thus description of such items will not be repeated. This embodiment differs from each of the previously discussed embodiments in that the position detecting means 7 is attached to the supporting body 1, the reflective surface 10 for reflecting infrared light from the position detecting means 7 and directing it to the face of the observer 6 is provided as part of the clamp member 4a or the image display means 5, and an infrared camera that is provided inside the position detecting means 7 captures the outline of the face of the observer. The movements of the face (or, more precisely, of the pupils of the observer) are followed by moving the image display means 5 using the driving means 3 so that the images captured by the infrared camera are always positioned symmetrically, left and right, about a center line of the field of vision.

The basic effects of this embodiment are the same as described above for Embodiment 1, and thus further description will be omitted except to note that, in this embodiment in particular, the electric cords and the position detecting means 7 can easily be sterilized, just as for Embodiment 2. Also, when a reflective surface is attached to the clamp member 4a, the configuration of the image display means itself is kept simple, and the production costs are lowered. Furthermore, the tracking precision does not change even if the image display means is changed.

EMBODIMENT 5

Figure 13:
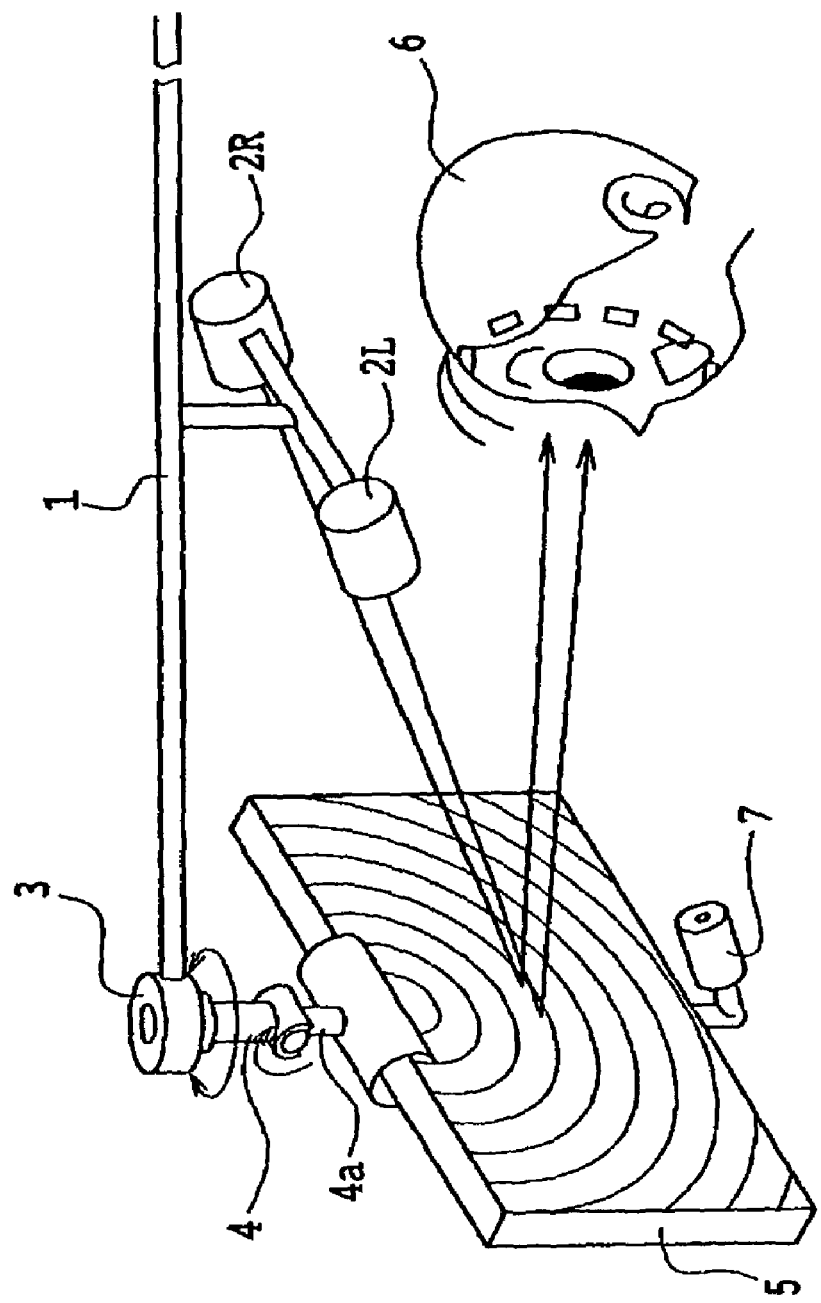
FIG. 13 shows a three-dimensional observation apparatus according to Embodiment 5.

FIG. 13 shows a three-dimensional observation apparatus according to Embodiment 5 of the present invention. Once again, like parts are identified with the same reference numerals as discussed in Embodiment 1, and thus further description of such items will be omitted. This embodiment differs from each of the previously discussed embodiments in that, in this embodiment, an edge image of the outline of the face of the observer 6 is output by the position detecting means 7 as a result of the CMOS image sensor chip of the position detecting means 7 being provided with a calculation function which determines the mid-point between the left and right outputted images. As before, the image display means 5 is controlled via a driving means 3, and the movements of the face of the observer, (i.e., the pupils of the observer) are tracked in order to maintain the image display means 5 oriented so that bright display images are observed even when the observer moves his head.

In this embodiment as well, the basic effects are the same as in previous embodiments and further description thereof will not be repeated except to note that, in this embodiment in particular, the position detecting means 7 may use either visible light or infrared light, because the outline of the face is detected rather than "red-eye" reflections from the retina. Of course, the image sensor should be matched, in terms of sensitivity of detecting, to the wavelength band of the emitted radiation. In this Embodiment, pupil tracking can be inexpensively realized without positioning a plurality of large image processing devices externally because the number of pixels detected by the image-sensing chip is low and the chip itself is provided with an edge detection function.

EMBODIMENT 6

Figure 14B:
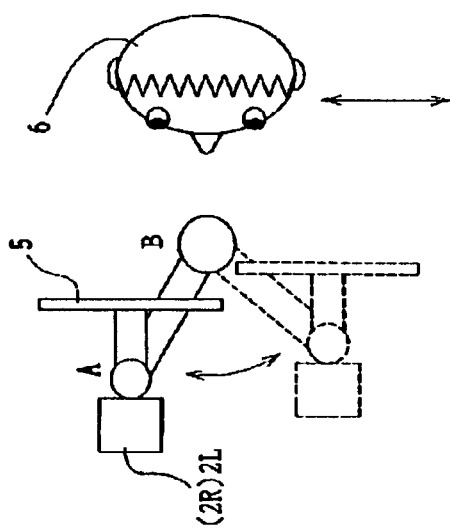
FIGS. 14(a) and 14(b) show a three-dimensional observation apparatus according to Embodiment 6, with FIG. 14(a) being a side view and with FIG. 14(b) being a top view.
Figure 14A:
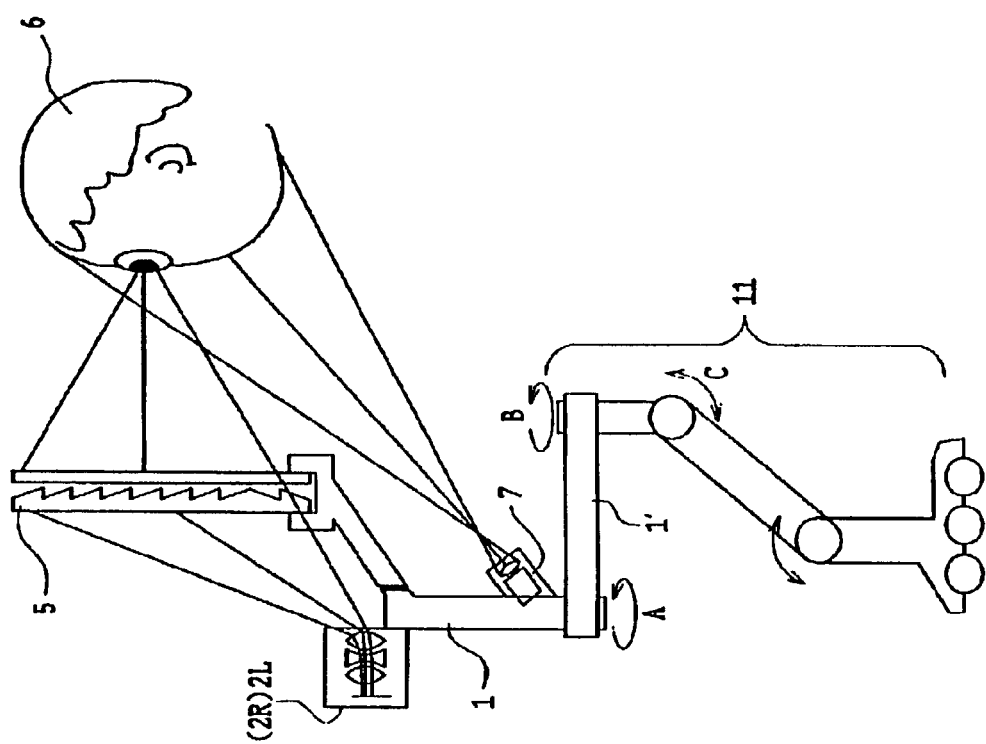

FIGS. 14(a) and 14(b) show a three-dimensional observation apparatus according to Embodiment 6 of the present invention, with FIG. 14(a) being a side view of the entire apparatus and FIG. 14(b) being a top view of the image display means 5 at two adjustment positions. This embodiment differs from previous embodiments in that the image display means 5 is a transparent display panel. That is, in this embodiment, a transparent image display means 5, image projection means 2R and 2L, and a position detecting means 7 are attached to a supporting body 1; the supporting body 1 is connected to a separate supporting body 1' via a rotating connecting member A. The supporting body 1 and the separate supporting body 1' together comprise a first supporting body and the first suoporting body is connected to a second supporting body 11 via a rotating connecting member B. Position detecting means 7 may use any one of the following: (1) detection of the outline of the face or of the pupils of the observer using an infrared LED and an infrared camera, (2) detection of the outline of the face of the observer using an infrared LED and an infrared camera, or (3) detection of the outline of the face of the observer using an infrared LED or a visible light LED, and a CMOS image sensor capable of outputting an edge detection image by providing a calculation function on the chip that forms the CMOS image sensor. Based on the signal output from the position detecting means 7, the image display means 5 is moved so as to track the movements of the observer using driving means that are provided inside the rotating connecting members A and B. Driving means for rotating the rotating connecting members A and B are interlinked so as to move while keeping the image display means 5 facing toward the observer, as shown in FIG. 14(*b*). The second supporting body 11 is provided with a rotating connection member C at two locations, and the up and down position of the image display means 5 is also adjusted so as to maintain a bright observation image despite movement of the observer left and right or up and down.

EMBODIMENT 7

A holographic optical element may be used, as one example, to form the diffusion plate. The holographic optical element may either be a transmission hologram or a reflection hologram. It is generally known that a transmission hologram that is recorded within a volume sensitive material has a lower wavelength sensitivity than does a reflection hologram. When used for displaying a color image, because it is necessary to record three holographic interference patterns in order to diffuse the light at three wavelengths, namely, R (red), G (green) and B (blue), it is preferable that a transmission hologram be employed due to its comparatively lower wavelength selectivity. A description is provided hereinafter of an image display means that employs in a single display panel a Fresnel mirror having positive refractive power and a transmission hologram for the diffusion plate, as described above. However, the description will discuss only one side, from among the right and left sides of the optical system, with the description of the other side being omitted.

Figure 15A:
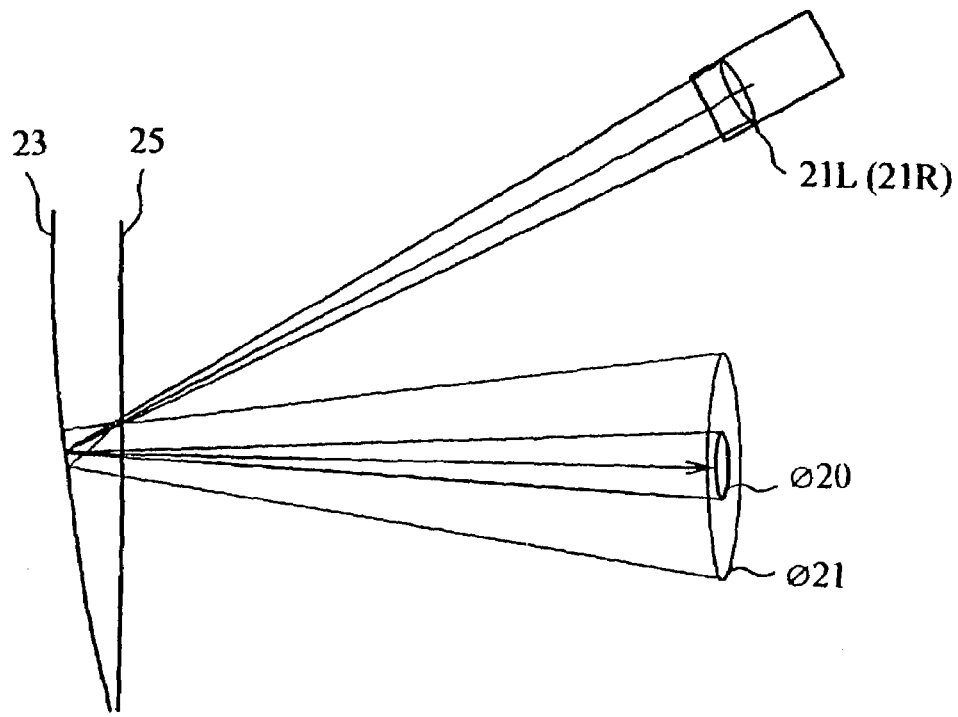
FIGS. 15(a) and 15(b) relate to another embodiment of a reflective three-dimensional display means that uses a holographic optical element as a dispersion means of a three-dimensional display panel that can be used with the three-dimensional display apparatus of the present invention, with FIG. 15(a) being a side explanatory diagram, and with FIG. 15(b) showing a similar display panel in use.
Figure 15B:
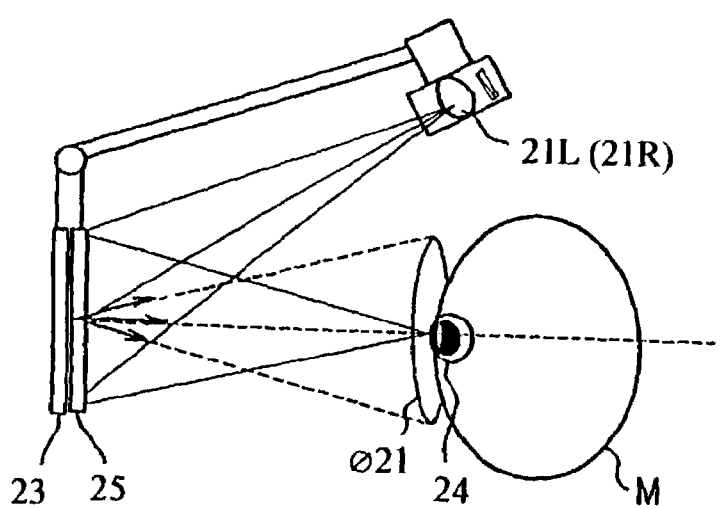

FIG. 15(*a*) shows an image display means that employs a display panel having a concave substrate, Fresnel mirror 23 of positive optical power and that uses, for a diffusion plate 25, a transmission hologram arranged in the vicinity of the projected image. FIG. 15(*b*) is a side view of a projection display means that employs a similar display panel using a substantially flat substrate, Fresnel mirror of positive optical power. A projection optical system 21L (21R) projects an image onto the display panel having a transmission hologram 25 arranged in the vicinity of the projected image. The display panel includes a Fresnel mirror 23 which forms exit pupils for the projection optical system at prescribed positions. Referring to FIG. 15(*b*), when an eye 24 of an observer M is placed at an exit pupil of the projection optical system, that eye can see images that are displayed on the display panel by the projection display means. Referring to FIG. 15(*a*), the exit pupil φ20 that is formed by the Fresnel mirror 23 is increased in size by way of the diffusion plate 25 to an exit pupil φ21, with the size of the exit pupil φ21 being sufficiently large for easy observation by the observer, but without the exit pupils for the right and left eyes overlapping. Thus, even if the positions of the eyes of the observer M are slightly misplaced from the ideal viewing positions, the observer will be able to view the displayed images. When the display panel is a reflection-type panel, the light arriving at the position of the exit pupil φ21 from the projection optical systems 21L (21R) passes through the diffusion plate 25 a total of two times. However, because the diffusion plate in this case is a holographic optical element, and the incidence angles of the light onto the transmission hologram are different for the two passes, the diffusion effect of the transmission hologram will occur only once, namely, when the incident light corresponds in incidence angle and wavelength to the reference beam used to form the transmission hologram.

In the case of observing projected images having a binocular parallax such as in a three-dimensional observation apparatus, if the diffusion angle becomes too large, the left eye will be able to observe images intended for the right eye, and vice-versa. When this occurs rather than a stereoscopic image being observed, instead, a double-image is seen. Therefore, the diffusion angle of the diffusion plate 25 having a transmission hologram is preferably below 8° (full width, measured at the half-maximum). Additionally, it is also preferable that the diffusion angle be less than or equal to 12° (full width, measured at ⅒ maximum), and that a minimum amount of light that is diffused more than 12° reach the observer. Therefore, when the diffusion plate 25 is formed of a transmission hologram, the diffused light intensity as a function of diffusion angle should rapidly decrease from the full width diffusion angle as measured at the half-maximum intensity points.

A description of the relationship between the diffusing and the bending (diffraction) action of the diffusion plate 25 when the diffusion plate is formed of a transmission hologram follows, and of the placement relationship of the diffusion plate 25, when formed of a transmission hologram and of the positive refractive power Fresnel mirror 23. As is well known in the art, a transmission hologram diffusion plate is made by recording the interference pattern between a reference beam and object light from a diffused light source (a secondary light source).

Figure 16A:
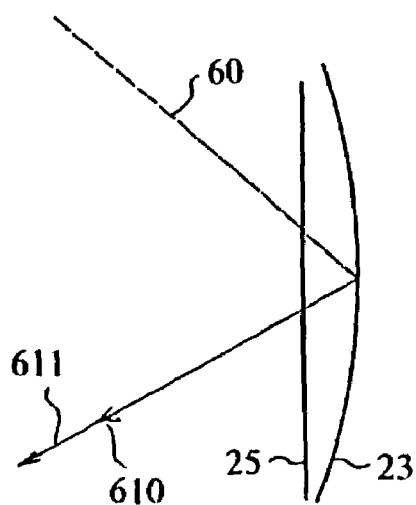
FIGS. 16(a)–17(b) are explanatory diagrams which are used to explain the diffusion and bending (diffraction) effect of the holographic optical element used in the display panel embodiment of FIGS. 15(*a*) and 15(*b*)

Referring to FIG. 16(*a*), when the interference pattern between a reference beam and a diffused light source is recorded for a transmission hologram, with both being on the same axis (i.e., in-line placement) and on one side of the recording material, then the center light ray of the light beam 60 from the projection optical system 21L (21R) initially enters into the diffusion plate 25 and passes directly through without being bent (diffracted) by the diffusion plate 25. This light is often referred to as the "zero-order light". Furthermore, after the light beam 60 has passed through the hologram, the ray directions are changed upon being reflected by the concave Fresnel mirror 23. These reflected light rays will then re-enter into the diffusion plate 25, but this time they are incident on the rear side. If the angle of incidence satisfies the reconstructed light incident angle (i.e., the angle where the diffraction efficiency approaches its peak) of the transmission hologram, then the light (other than the zero-order light) will be diffused by way of diffraction.

On the other hand, if the angle of incidence of the incident light at the time of the second incidence satisfies the reconstructed light incidence angle, then the main light beam 60 at the time of the first transmission passes directly through without diffraction, and the light around the center light ray that passes through at the time of the second transmission will be diffused. In either case, the zero-order light 610 and the main light beam 611 proceed in the same direction. FIG. 16(*a*) shows these elements but the diffused light is not shown. In this drawing, only the central light ray 611 from among the diffused light being diffracted and the zero-order light 610 that is not diffracted by the diffusion plate 25 are shown. The zero-order light 610 and center ray of the main light beam 611 proceed in the same direction and arrive at the center of the exit pupil φ21 of the projection display device. Accordingly, as shown in FIG. 16(*a*), a case wherein the diffusion plate 25 formed of a transmission hologram has only a diffusion action and does not have a bending action on the optical path, not only the diffused light but also the zero-order light 610 arrive at the exit pupil φ21. The undesirable result is that a spot can be seen for the zero-order light 610 in the center of the projected image being observed.

Figure 16B:
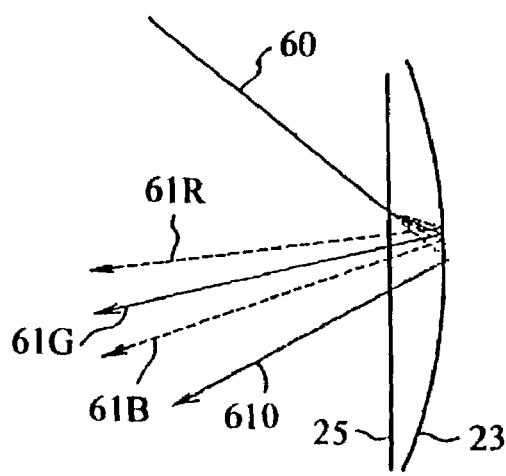
Figure 16C:
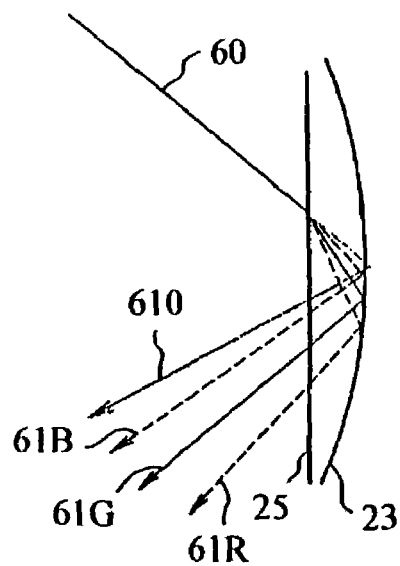
Figure 17A:
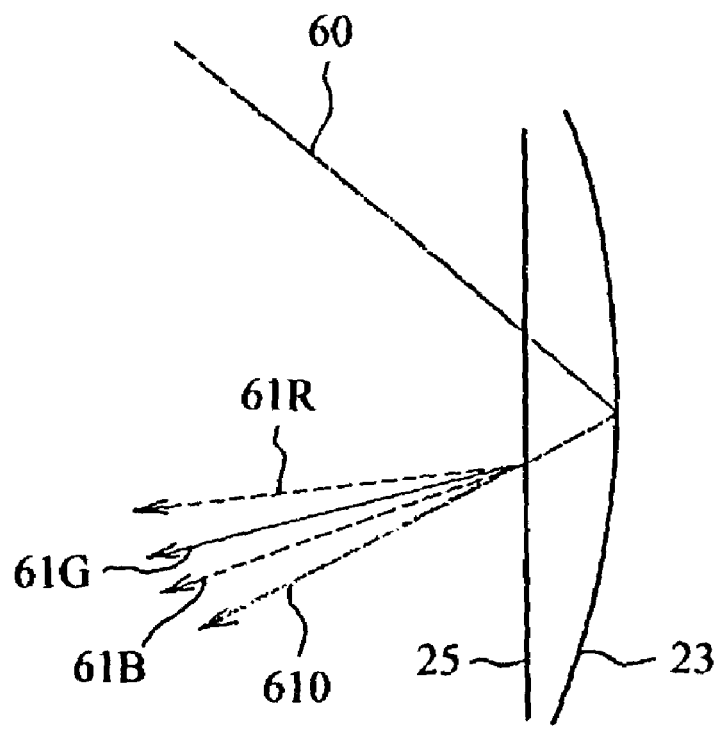
Figure 17B:
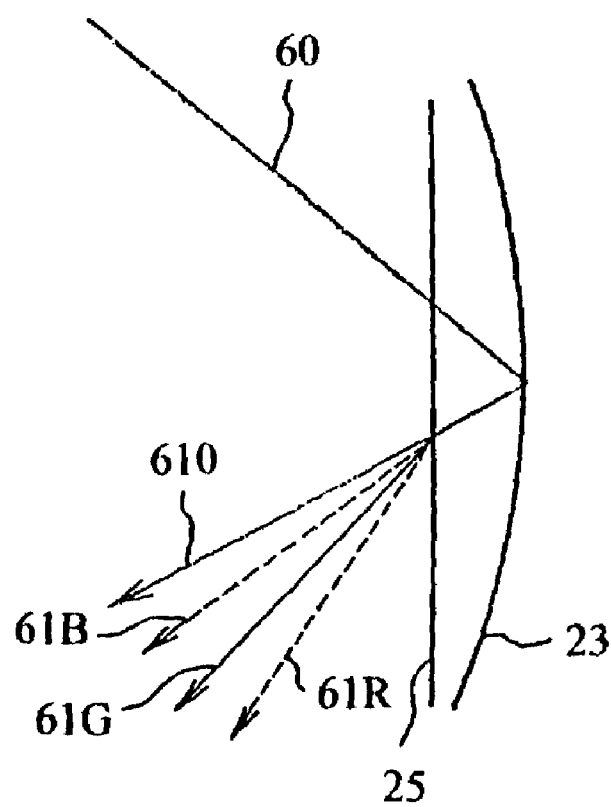
Figure 18:
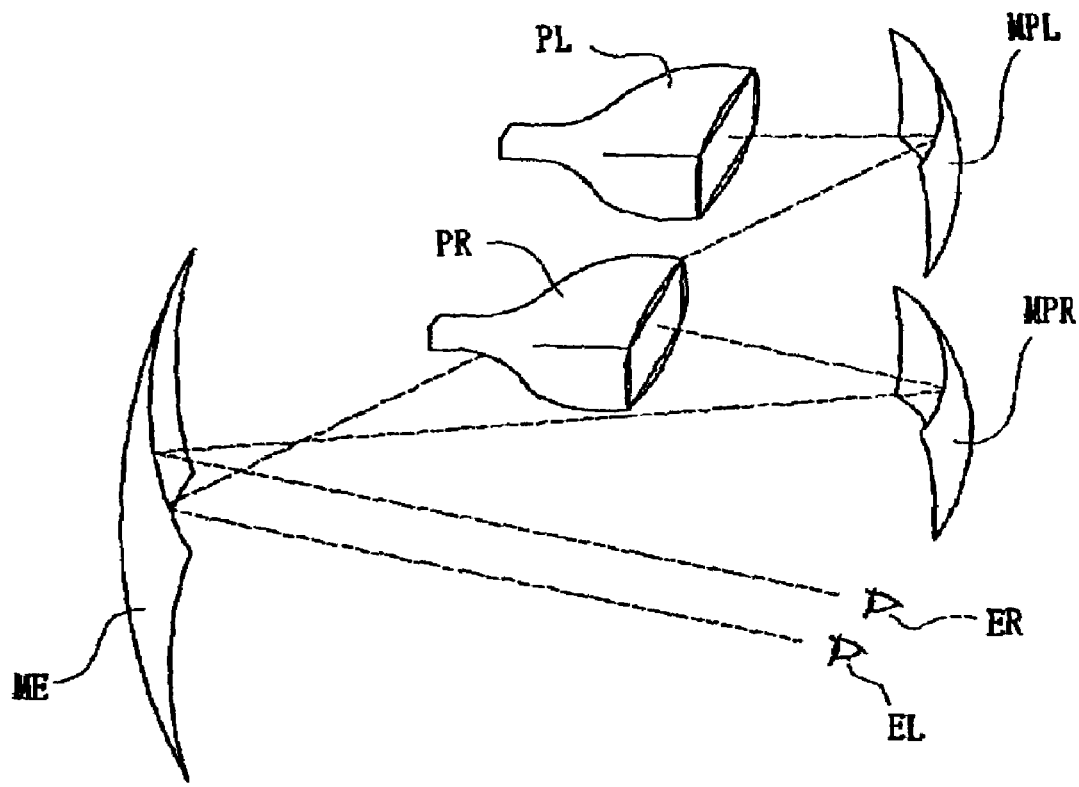
FIG. 18 is a perspective view of a conventional stereoscopic observation device.
Figure 19:
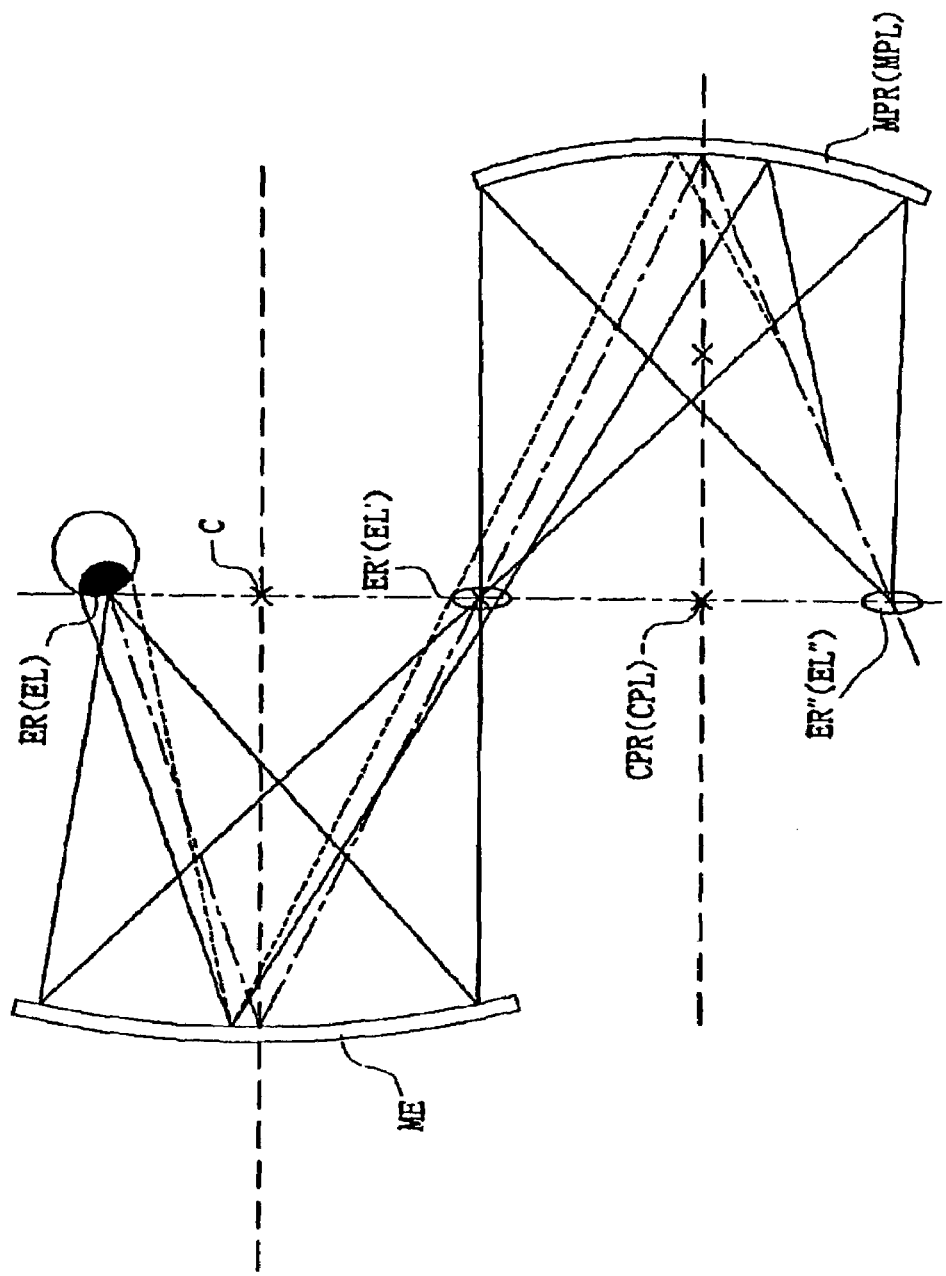
FIG. 19 is a side view of the conventional stereoscopic observation device shown in FIG. 18.

For this reason, a diffusion plate 25 formed of an off-axis, transmission hologram is preferably used. With such a diffusion plate, a bending of the light beam together with diffusing occurs when the incident light satisfies the wavelength and incidence angle of the beam used to construct the transmission hologram. FIGS. 16(b) and 16(c) show the case where the incident light satisfies the wavelength and incidence angle of the beam used to construct the transmission hologram upon first incidence; and FIGS. 17(a) and 17(b) show the case where the incident light satisfies the wavelength and incidence angle of the beam used to construct the transmission hologram at the second incidence. FIG. 16(b) and FIG. 17(a) illustrate the diffraction angle being toward the normal to the surface; and FIG. 16(c) and FIG. 17(b) illustrate the diffraction angle being away from the normal to the surface. In each drawing, the indication of the diffused light other than the central ray is omitted. Thus, only the central rays, of the diffused beams of wavelengths R, G, B that are diffracted by the diffusion plate 25, are shown by 61R, 61G, and 61B, respectively. As is evident from each of the drawings, when using a transmission hologram having a bending action on the light beam at the diffusion plate 25, it becomes possible to separate the zero-order light 610 that is not diffracted by the hologram from the diffracted beams 61R, 61G and 61B. As a result it is possible to provide a construction wherein the zero-order light is not visible from the exit pupil φ21 of the projection display apparatus. More specifically, a construction is preferred wherein the positioning of the exit pupil φ21 of the projection display device is such that the zero-order light 610 enters after being separated by at least one-half the pupil diameter from the center of the exit pupil φ21.

Thus, according to the present invention as described above, a three-dimensional observation apparatus can be provided whereby image distortion is not produced even when one moves his head while observing using the three-dimensional observation apparatus, and a bright, easy-to-see, stereoscopic image can be observed without wearing special glasses.

The invention being thus described, it will be obvious that the same may be varied in many ways. For example, the configurations of the above embodiments may be used in any combination. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A three-dimensional observation apparatus comprising:
a pair of image projection means;
an image display means;
a position detecting means for detecting movements of an observer of images displayed by the image display means; and
driving means for tracking movements of the observer and for moving the image display means based on changes of signals that are output from the position detecting means; wherein
the pair of image projection means and the image display means are configured such that the pair of image projection means projects a right eye image, and a left eye image, and the image display means presents these images to the right eye and left eye, respectively, of an observer;
the pair of image projection means, the image display means, and the position detecting means are mounted on a first supporting body;
the first supporting body is mounted to a second supporting body that supports the first supporting body via the driving means; and
the driving means is configured so as to be capable of moving the pair of image projection means, the image display means, and the position detecting means via the first supporting body as a whole relative to the second supporting body.

2. The three-dimensional observation apparatus according to claim 1, wherein:
the pair of image projection means, the image display means, the position detecting means, and the driving means are mounted on one supporting body;
the position detecting means includes an infrared LED and an infrared camera;
the infrared LED is positioned so as to be capable of irradiating infrared light onto the face or the pupils of the left and right eyes of the observer; and
the infrared camera is positioned so as to be capable of imaging retinal reflected images of the pupils or an outline of the face of the observer.

3. The three-dimensional observation apparatus according to claim 2, wherein a mirror is integrally provided to the image display means, and the mirror is positioned so as to direct infrared light or visible light from the position detecting means to the eyes or face of the observer.

4. The three-dimensional observation apparatus according to claim 1, wherein:
the pair of image projection means, the image display means, the position detecting means, and the driving means are mounted on one supporting body;
the position detecting means includes an LED and a camera;
the LED is positioned so as to be capable of irradiating the face of the observer by emitting visible light; and
the camera is positioned so as to be capable of imaging an outline of the face of the observer.

5. The three-dimensional observation apparatus according to claim 4, wherein a mirror is integrally provided to the image display means, and the mirror is positioned so as to direct infrared light or visible light from the position detecting means to the eyes or face of the observer.

6. The three-dimensional observation apparatus according to claim 1, wherein:
the pair of image projection means, the image display means, the position detecting means, and the driving means are mounted on one supporting body;
the position detecting means includes an LED and a CMOS image sensor;
the LED is positioned so as to be capable of irradiating the face of the observer by emitting visible light or infrared light; and
the CMOS image sensor is capable of outputting an edge detection image and is positioned so as to be capable of capturing the outline of the face irradiated by the LED.

7. The three-dimensional observation apparatus according to claim 1, wherein the image display means is mounted so as to be movable also in a direction that is orthogonal to the movement direction resulting from the driving means.

8. The three-dimensional observation apparatus according to claim 7, wherein the second supporting body is configured so as to be capable of folding.

9. The three-dimensional observation apparatus according to claim 1, wherein a mirror is integrally provided to the image display means, and the mirror is positioned so as to direct infrared light or visible light from the position detecting means to the eyes or face of the observer.

10. The three-dimensional observation apparatus according to claim 1, wherein the second supporting body is configured so as to be capable of folding.

11. The three-dimensional observation apparatus according to claim 1 wherein:
the image display means includes image-forming means and diffusing means;
the image-forming means is configured and positioned so as to be capable of forming images of each aperture of the pair of image projection means at respective pupil positions of the observer; and
the diffusing means is configured and positioned so as to form, in cooperation with the image-forming means, enlarged images of each aperture of the pair of image projection means.

12. The three-dimensional observation apparatus according to claim 11, wherein the image forming means is eccentric to the center of the image display means.

13. The three-dimensional observation apparatus according to claim 11, wherein the image forming means comprises a Fresnel mirror having positive optical power.

14. The three-dimensional observation apparatus according to claim 13, wherein the Fresnel mirror is formed into an aspheric surface whereby the radius of curvature increases toward the periphery.

15. The three-dimensional observation apparatus according to claim 11, wherein the diffusing means comprises an optical member which achieves a diffusing effect via particles with differing refractive indices mixed in the interior thereof.

16. The three-dimensional observation apparatus according to claim 11, wherein the diffusing means comprises an optical member which includes molecules having birefringent properties in the interior of the optical member.

17. The three-dimensional observation apparatus according to claim 11, wherein the diffusing means comprises an optical member which produces scattering through a refractive effect resulting from corrugated shapes formed on the surface of the optical member.

18. The three-dimensional observation apparatus according to claim 11, wherein the diffusing means is a transmission hologram.

19. The three-dimensional observation apparatus according to claim 1, wherein
the image display means is rotatably mounted to the first supporting body and the first supporting body is rotatably mounted to the second supporting body via the driving means; and
the rotation axis of the first supporting body is orthogonal to the rotation axis of the second supporting body.

* * * * *